Patented Dec. 19, 1933

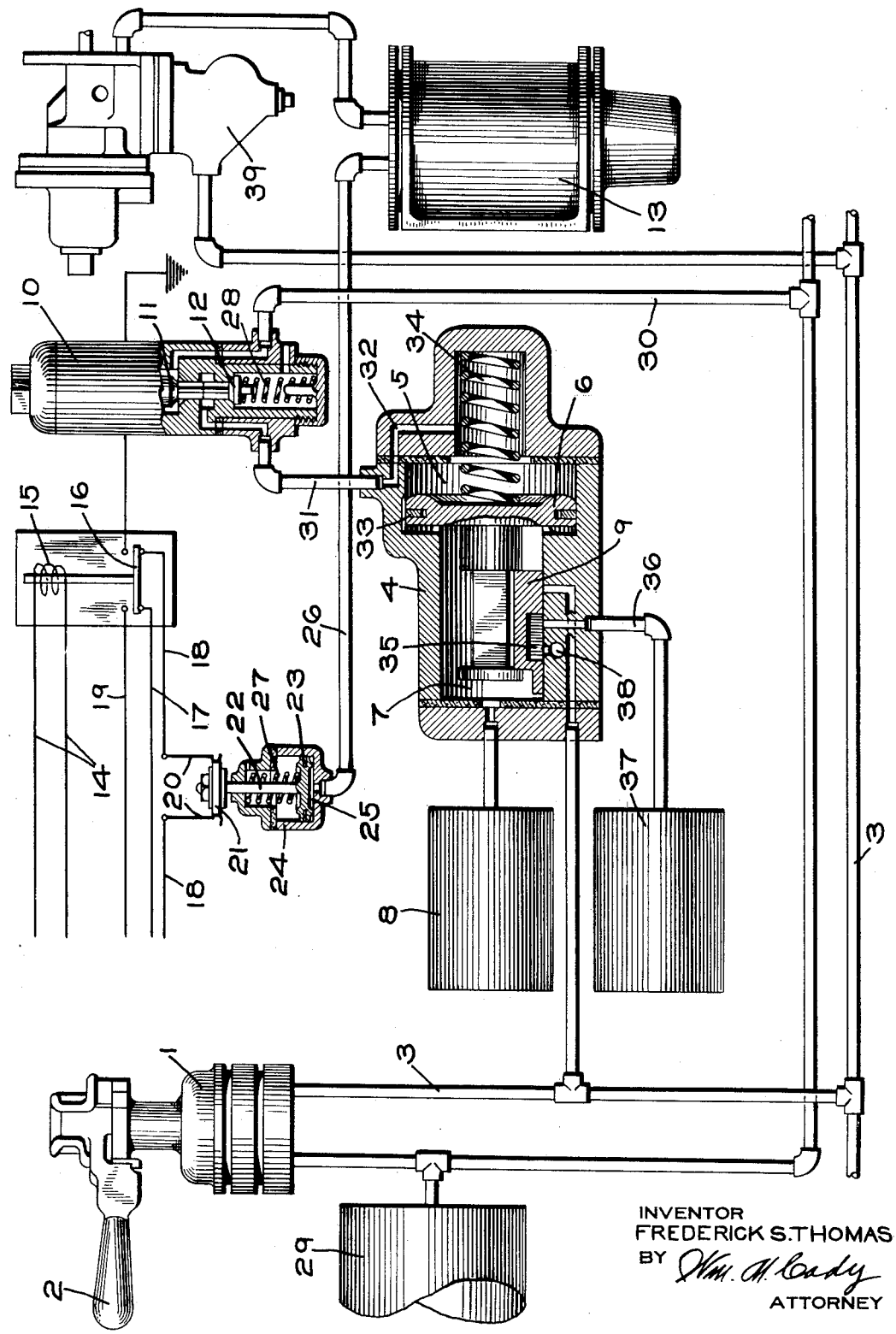

1,939,866

UNITED STATES PATENT OFFICE 1,939,866

DYNAMIC AND AIR BRAKE INTERLOCK

Frederick S. Thomas, Tokyo, Japan, assignor to The Westinghouse Air Brake Company, Wilmerding, Pa., a corporation of Pennsylvania Application April 14, 1930. Serial No. 443,944

7 Claims. (Cl. 303—3)

This invention relates to brakes for railway trains, and more particularly to a brake equipment in which an electrodynamic brake is employed.

With the synchronous motors commonly used on electric locomotives, where the motors are used as generators to effect a regenerative braking action, the motors will only operate to generate current when the speed is between certain limits. For example, if the motors are designed for a synchronous speed of thirty miles per hour, the motors when acting as generators will not generate current to any extent, if the speed is less than 28 miles per hour or greater than 32 miles per hour. Consequently in down grade service, if the speed exceeds 32 miles per hour, the regenerative braking effect will be substantially lost.

The principal object of my invention is to provide a dynamic brake equipment and means for cutting a fluid pressure brake into action when the speed of the train is excessive in down grade service.

In the accompanying drawing, the single figure is a diagrammatic view, partly in section, of a dynamic brake controlling apparatus embodying my invention.

The fluid pressure brake apparatus may comprise a brake valve device 1 of the usual construction having an operating handle 2 and adapted to supply fluid under pressure to the usual brake pipe 3 and to vent fluid under pressure from the brake pipe so as to effect an application of the brakes.

A valve device for effecting an application of the brakes is provided comprising a casing 4, having a piston chamber 5 containing a piston 6 and having a valve chamber 7 connected to a reservoir 8 and containing a slide valve 9 adapted to be operated by piston 6.

A magnet valve device is provided comprising an electromagnet 10 and double beat valves 11 and 12 adapted to be operated upon energization and deenergization of the magnet 10. The usual brake cylinder 13 is provided and the usual triple or other brake controlling valve device 39 is adapted upon a reduction in brake pipe pressure to supply fluid under pressure to the brake cylinder and upon an increase in brake pipe pressure to release fluid from the brake cylinder.

The dynamic brake apparatus is not shown in the drawing, since it is not deemed necessary to a clear understanding of the invention, but it will be understood that when the dynamic brake is cut in, the circuit wires 14 are connected up so as to be energized by the counter E. M. F. of the car motor so that the relay 15, connected in said circuit wires, will be energized according to speed of the car and the counter E. M. F. generated.

The relay coil 15 controls a switch member 16 and in one position of the member 16, a circuit is closed from wire 17 to wire 18, the closing of which circuit is necessary in order that the dynamic brake will be effective and operative.

In the other position of the switch member 16, a circuit is closed from a wire 19 to the magnet 10, the wire 19 being connected to a source of current, so that magnet 10 is energized when the circuit is closed.

Interposed in the circuit wire 18 are contacts 20 adapted to be bridged by a contact member 21. The contact member 21 is connected by a stem 22 to a piston 23, which is contained in a casing 24. The chamber 25 at one side of the piston 23 is connected by pipe 26 to the brake cylinder 13, and the piston 23 is subject to the pressure of a coil spring 27 which urges the piston downwardly and the switch member 21 into engagement with the contacts 20.

When the dynamic brake is not acting, there is no current flowing through the circuit wires 14, so that magnet 10 is deenergized. The valve 12 is then seated by spring 28 and the valve 11 is unseated, so that fluid under pressure is supplied from the usual main reservoir 29, through pipe 30 to pipe 31 and passage 32, leading to piston chamber 5 of the application valve device 4. Fluid flows through feed groove 33 around piston 6 and charges the valve chamber 7 and reservoir 8 with fluid under pressure. The spring 34 then maintains piston 6 in its release position, as shown in the drawing.

In operation, when it is desired to apply the brakes, the usual controller (not shown) is moved to a dynamic braking position, in which circuits are set up for effecting dynamic braking. If the speed of the train is not excessive, the relay coil 15 will not be energized by the counter E. M. F. of the car motor sufficiently to cause movement of the switch member 16 from the position shown in the drawing.

The circuit will thus remain closed through th wires 17 and 18, so that the dynamic brake operates. If the speed of the train is high, the current flowing through the wires 14 will be sufficient to energize the coil 15 so as to effect the movement of the switch member 16 to its upper position. The movement of the switch member 16 to its upper position effects the opening of the circuit through wires 17 and 18, so that the dynamic brake is prevented from acting. The circuit is also closed from wire 19 to the magnet 10, so that said magnet is energized and thereby the valve 11 is moved to its seat, while valve 12 is unseated. The unseating of valve 12 permits the venting of fluid under pressure from the piston chamber 5, so that piston 6 is shifted outwardly by the fluid pressure in valve chamber 7. In the outer position of piston 6, a cavity 35 in slide valve 9 connects the brake pipe 3 with a pipe 36 leading to a reduction limiting reservoir 37, said reservoir being normally maintained at atmospheric pressure in the release position of the slide valve 9 through its connection to exhaust port 38.

Fluid under pressure is then vented from the brake pipe to effect a predetermined reduction in brake pipe pressure by equalization into reservoir 37, and the brakes are applied in the usual manner by the operation of the triple valve device 39 to supply fluid under pressure to the brake cylinder 13. Fluid under pressure supplied to the brake cylinder is also supplied to piston 23, and when the brake cylinder pressure has been increased to a predetermined degree, the piston 23 is shifted upwardly, against the pressure of spring 27, so that the switch member 21 is also shifted to open the circuit through the wire 18.

When the speed of the car has been reduced to a predetermined degree, the counter E. M. F. of the car motor will reduce so that the coil 15 will not be energized sufficiently to hold the switch member 16 in its upper position and the switch member will then move to its lower position, in which the circuit is again closed from wire 17 to wire 18.

The circuit, however, will still be open at the contact 20, since the switch member 21 is held in open position by brake cylinder pressure. The magnet 10 is deenergized by the downward movement of switch member 16, and consequently, the valve 12 is moved to its seat, while valve 11 is unseated. With valve 11 unseated, fluid under pressure is supplied from pipe 30 to piston chamber 5 and piston 6 is thereby shifted to release position. The brake valve 1 being in running position, the brake pipe 3 will be recharged in the usual manner and the brakes will be released by the restoration of brake pipe pressure.

When the brake cylinder pressure has been reduced to a predetermined degree as the brakes are being released, the piston 23 will be shifted downwardly by spring 27, so that the switch member 21 is shifted to its position closing the circuit through wire 18. The dynamic brake is then cut into action. By this means, the dynamic brake is prevented from acting until the fluid pressure brake has been released, so that the braking force will not be excessive due to the fluid pressure brake being applied at the same time that the dynamic brake is cut in.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a dynamic brake circuit, of a car fluid pressure brake apparatus and means operative automatically when the speed of the car exceeds a predetermined rate for opening said circuit and means operated upon opening said circuit for effecting the operation of said brake apparatus to cause a fluid pressure application of the brakes.

2. In a car braking system, the combination with a circuit associated with a dynamic brake system, the closure of which permits the dynamic brake to act, of a fluid pressure brake apparatus, electrically controlled means for effecting the operation of said apparatus to cause a fluid pressure application of the brakes, a switch device for controlling said circuit and the circuit of said electrically controlled means, and means energized by a voltage proportional to the speed of the car for operating said switch device.

3. In a car braking system, the combination with a circuit associated with a dynamic brake system, the closure of which permits the dynamic brake to act, of a fluid pressure brake apparatus, electrically controlled means operative upon energization to effect the operation of said apparatus to cause a fluid pressure application of the brakes, a switch adapted in one position to close said circuit and in another position to close the circuit of said electrically controlled means, and means operated when the speed of the car exceeds a predetermined rate for operating said switch to open the dynamic brake circuit and close the circuit of said electrically controlled means.

4. In a car braking system, the combination with a circuit associated with a dynamic brake system, the closure of which permits the dynamic brake to act, of a brake pipe, a valve device operated by a variation in fluid pressure for effecting a reduction in brake pipe pressure, and a brake cylinder adapted to be supplied with fluid under pressure upon a reduction in brake pipe pressure, a switch for controlling said circuit, and means operated by brake cylinder pressure for operating said switch to open said circuit.

5. In a car braking system, the combination with a circuit associated with a dynamic brake system, the opening of which prevents the dynamic brake from acting, of a brake cylinder, electrically controlled means operative upon energization for effecting the supply of fluid under pressure to the brake cylinder, a switch for controlling said circuit and the circuit of said electrically controlled means, a control circuit, the voltage in which is varied according to the speed of the car, and means operated at a predetermined increase in voltage in said control circuit for operating said switch to open the dynamic brake circuit and close the circuit to said electrically controlled means.

6. In a car braking system, the combination with a circuit associated with a dynamic brake system, the opening of which prevents the dynamic brake from acting, of a brake cylinder, electrically controlled means operative upon energization for effecting the supply of fluid under pressure to the brake cylinder, a switch for controlling said circuit and the circuit of said electrically controlled means, a control circuit, the voltage in which is varied according to the speed of the car, means operated upon a predetermined increase in voltage in the control circuit for operating said switch to open the dynamic brake circuit and close the circuit to said electrically controlled means, an additional switch for controlling said dynamic brake circuit, and means controlled by brake cylinder pressure for operating said additional switch.

7. In a car braking system, the combination with a circuit associated with a dynamic brake system, the opening of which prevents the dynamic brake from acting, of a brake cylinder, electrically controlled means operative upon energization for effecting the supply of fluid under pressure to the brake cylinder, a switch for controlling said circuit and the circuit of said electrically controlled means, a control circuit, the voltage in which is varied according to the speed of the car, means operated upon a predetermined increase in voltage in the control circuit for operating said switch to open the dynamic brake circuit and close the circuit to said electrically controlled means, an additional switch for controlling said dynamic brake circuit, and means controlled by brake cylinder pressure and operated upon a predetermined increase in brake cylinder pressure for actuating said additional switch to open said dynamic brake circuit and upon a predetermined decrease in brake cylinder pressure for operating said additional switch to close said circuit.

FREDERICK S. THOMAS.